US007414231B2

(12) United States Patent
Fukui (10) Patent No.: US 7,414,231 B2
(45) Date of Patent: Aug. 19, 2008

(54) FOCUS-STATE DETECTING DEVICE, IMAGE SENSING APPARATUS AND IMAGE SENSING SYSTEM HAVING SAME AND LENS UNIT MOUNTED THEREON

(75) Inventor: Hajime Fukui, Suginami-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/235,992

(22) Filed: Sep. 28, 2005

(65) Prior Publication Data

US 2006/0066957 A1 Mar. 30, 2006

(30) Foreign Application Priority Data

Sep. 29, 2004 (JP) ............................. 2004-285164

(51) Int. Cl.
*G02B 7/04* (2006.01)
*G01J 3/50* (2006.01)
(52) U.S. Cl. ................................... 250/201.2; 250/226
(58) Field of Classification Search ............. 250/201.2, 250/201.4, 201.5, 216, 221; 396/72, 91–93, 396/104, 125, 89, 77, 79, 80–82, 111; 359/637
See application file for complete search history.

(56) References Cited

U.S. PATENT DOCUMENTS

| | | | | |
|---|---|---|---|---|
| 4,523,828 A | * | 6/1985 | Kato | 396/93 |
| 4,571,047 A | * | 2/1986 | Hirai | 396/93 |
| 4,696,558 A | * | 9/1987 | Karasaki et al. | 396/104 |
| 4,746,948 A | * | 5/1988 | Matsui | 396/129 |
| 5,012,268 A | * | 4/1991 | Hirai | 396/227 |
| 5,091,742 A | * | 2/1992 | Fukahori et al. | 396/123 |
| 5,113,210 A | * | 5/1992 | Kashiyama et al. | 396/86 |
| 5,146,261 A | * | 9/1992 | Soshi | 396/93 |
| 5,212,375 A | * | 5/1993 | Goto et al. | 250/201.7 |
| 5,517,273 A | * | 5/1996 | Tsukada | 396/91 |
| 5,748,994 A | * | 5/1998 | Kai et al. | 396/55 |
| 6,009,280 A | * | 12/1999 | Akamatsu et al. | 396/121 |
| 6,363,220 B1 | * | 3/2002 | Ide | 396/98 |
| 6,424,805 B2 | * | 7/2002 | Ohsawa | 396/50 |
| 6,707,995 B1 | * | 3/2004 | Ichikawa et al. | 396/100 |

(Continued)

FOREIGN PATENT DOCUMENTS

JP 58-059413 4/1983

(Continued)

OTHER PUBLICATIONS

Japanese Office Action dated Dec. 22, 2006 issued by the Japanese Patent Office for a corresponding Japanese Patent Application.

(Continued)

*Primary Examiner*—Que Le
*Assistant Examiner*—Pascal M Bui-Pho
(74) *Attorney, Agent, or Firm*—Morgan & Finnegan, LLP (57) ABSTRACT

A focus-state detecting device, to which a removable lens unit is mounted, that includes, for example, a focus-state detection unit that detects a focus-adjusted state; a first acquisition unit that acquires information on chromatic aberration; a second acquisition unit that acquires information on spectral characteristics of a subject; a correction unit that corrects information on the focus-adjusted state which has been detected by the focus-state detection unit; and a control unit that repeats operations.

10 Claims, 8 Drawing Sheets

U.S. PATENT DOCUMENTS

2005/0158044 A1 * 7/2005 Ide et al. .................. 396/71

FOREIGN PATENT DOCUMENTS

| | | |
|---|---|---|
| JP | 58-086504 | 5/1983 |
| JP | 60-043620 | 3/1985 |
| JP | 1-221713 | 9/1989 |
| JP | 01-0458830 | 10/1989 |
| JP | 4-122920 | 4/1992 |
| JP | 2000-275512 | 10/2000 |
| JP | 2001-352481 | 12/2001 |
| JP | 2002-072070 | 3/2002 |
| JP | 2002-214520 | 7/2002 |
| JP | 2003-241282 | 8/2003 |
| JP | 2004-212892 | 7/2004 |

OTHER PUBLICATIONS

Japanese Office Action dated Jun. 12, 2007 issued by the Japanese Patent Office for a corresponding Japanese Patent Application.

* cited by examiner

AMOUNT SHIFT IN FOCUS BETWEEN DAYLIGHT AND LIGHT FROM FLUORESCENT LAMP [mm]

| FOCAL LENGTH | DISTANCE TO SUBJECT | | | | | | | | | |
|---|---|---|---|---|---|---|---|---|---|---|
| | 0.5~0.7m | 0.7~1m | 1~1.4m | 1.4~2m | 2~2.8m | 2.8~4m | 4~5.6m | 5.6~8m | 8~11m | 11m OR GREATER |
| 35~39mm | 0.05 | 0.045 | 0.04 | 0.035 | 0.03 | 0.025 | 0.02 | 0.015 | 0.01 | 0.005 |
| 40~44mm | 0.06 | 0.055 | 0.05 | 0.045 | 0.04 | 0.035 | 0.03 | 0.025 | 0.02 | 0.015 |
| 45~49mm | 0.07 | 0.065 | 0.06 | 0.055 | 0.05 | 0.045 | 0.04 | 0.035 | 0.03 | 0.025 |
| 50~54mm | 0.08 | 0.075 | 0.07 | 0.065 | 0.06 | 0.055 | 0.05 | 0.045 | 0.04 | 0.035 |
| 55~59mm | 0.09 | 0.085 | 0.08 | 0.075 | 0.07 | 0.065 | 0.06 | 0.055 | 0.05 | 0.045 |
| 60~64mm | 0.1 | 0.095 | 0.09 | 0.085 | 0.08 | 0.075 | 0.07 | 0.065 | 0.06 | 0.055 |
| 65~70mm | 0.11 | 0.105 | 0.1 | 0.095 | 0.09 | 0.085 | 0.08 | 0.075 | 0.07 | 0.065 |

F I G. 8A

F I G. 8B

FOCUS-STATE DETECTING DEVICE, IMAGE SENSING APPARATUS AND IMAGE SENSING SYSTEM HAVING SAME AND LENS UNIT MOUNTED THEREON

FIELD OF THE INVENTION

This invention relates to a focus-state detecting device, an image sensing apparatus, an image sensing system and a lens unit. More particularly, the invention relates to a technique for improving focusing precision under various light sources when autofocusing is performed.

BACKGROUND OF THE INVENTION

So called TTL (through the lens) phase-difference detection-type autofocus is employed widely in film-type and digital single lens reflex cameras. In this type of autofocus system, a light beam that has passed through an image sensing lens is split by a beam splitter, the optical axes of the split beams are shifted relative to each other, images are formed on a focus-state sensor by two image forming lenses, an amount of defocus is calculated from the displacement between the two images and the image sensing lens is driven in accordance with the defocus amount to achieve the in-focus state.

In addition, so-called contrast-detection autofocus is employed widely in video cameras and the like. With this autofocus system, high-frequency components in the image of a subject formed on an image sensing device are extracted and the position at which these high-frequency components reach their highest while the image sensing lens is being driven is adopted as the in-focus position.

A comparison of these two autofocus systems reveals that with the phase-difference detection method, the defocus amount can be sensed directly from the displacement between two images and focusing can be achieved by a single focus-state detecting operation. An advantage, therefore, is that the autofocus (AF) operation can be performed very quickly. On the other hand, the beam splitter for splitting the entrant light beam, the AF image-forming optical system and the focus-state sensor must be provided besides the image-sensing optical system. A drawback, therefore, is higher cost.

With the contrast-detection method, however, it is unnecessary to provide a special AF detection system and, hence, there is an advantage in terms of cost. In addition, since discrimination of the in-focus state can be achieved directly in the image-sensing plane, a further advantage is that focusing precision is excellent. On the other hand, a defocus amount cannot be obtained directly, as it can with the phase-difference detecting method, and it is necessary to find the in-focus position by repeating the operation of detecting the high-frequency components of the captured image while moving the image sensing lens in small increments. In comparison with the phase-difference detecting method, therefore, focusing speed is, in general, very slow.

For these reasons, the TTL phase-difference detecting method has been widely adopted in still-image single-lens reflex cameras that place prime importance on quick focusing. Nevertheless, owing to the fact that the image sensing system and focus-state detecting system are different, the following problem arises in addition to the problem of higher cost:

In the case of ordinary silver-halide emulsion film, the spectral sensitivity characteristic of the image sensing system usually exhibits the greatest sensitivity to light on the order of 400 to 650 nm in order to provide a color reproducibility that conforms to the characteristic of the human eye. On the other hand, a silicon photodiode that performs a photoelectric conversion in an image sensing device such as a CMOS sensor generally has a sensitivity peak on the order to 800 nm. Although it possesses a sensitivity up to 1100 nm on the long-wavelength side, sensitivity is sacrificed and light of a wavelength outside the above-mentioned frequency range is cut by a filter or the like in order to emphasize color reproducibility.

A photoelectric converter serving as a sensor used for autofocusing similarly has a sensitivity up to 1100 nm. However, in a case where focusing is performed under low luminance, or in a case where focusing cannot be performed under low luminance, light from a near-infrared (on the order of 700 nm) light-emitting diode illuminates the subject from the camera and therefore the sensor has a sensitivity up to a wavelength region that is 100 nm longer than that of the image sensing system.

Figure 8A:
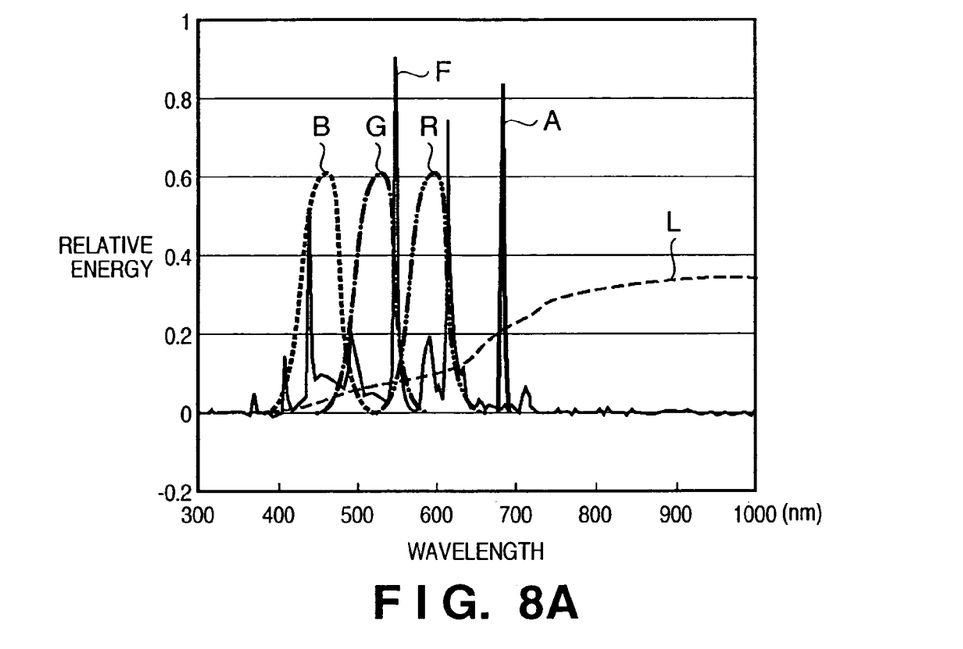
FIG. 8A is a graph illustrating the spectral sensitivities of light sources, an image sensing device and auxiliary light.

FIG. 8A is a graph illustrating the spectral sensitivity of an image sensing device as well as the spectral characteristics of light sources and of auxiliary light. The abscissa is a plot of the wavelength of light and the ordinate a plot of relative energy. In FIG. 8A, B, G, and R represent the spectral sensitivities of blue, green and red pixels, respectively, of a primary-color image sensing device, and F, L and A indicate the spectral characteristics of a fluorescent lamp, floodlight lamp and auxiliary light from the above-mentioned light-emitting diode or the like, respectively. Further, FIG. 8B is a graph illustrating relative displacement of the focus position, which is due to chromatic aberration of the image sensing lens, versus the wavelength of light.

It will be understood from FIG. 8A that light from the fluorescent lamp contains almost no wavelength components longer than 620 nm, whereas the relative energy of light from the floodlight lamp increases as wavelength becomes longer.

Figure 8B:
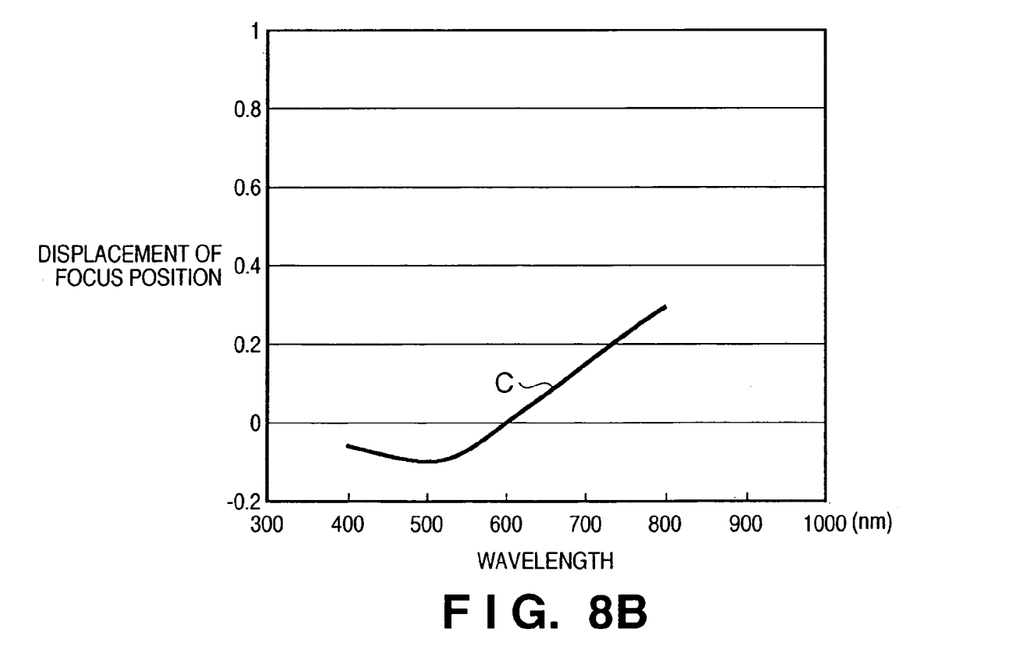
FIG. 8B is a graph illustrating an example of amount of shift in focus with respect to the wavelength of light.

On the other hand, it will be understood from curve C in FIG. 8B that the amount of displacement of the focus position changes in dependence upon wavelength and increases in a direction in which the focal length elongates as the wavelength becomes longer.

Accordingly, in the case where the light source that illuminates a subject is a fluorescent lamp having few long wavelength components, a point in the vicinity of 545 nm, which is the emission-line peak, is the center of the spectral distribution of the light source. As illustrated in FIG. 8B, therefore, the focal length of the lens is a direction that shortens. In the case of a floodlight lamp having many long wavelength components, the longer the wavelength component, the higher the energy and, hence, the focal length of the lens is a direction that elongates. Consequently, a problem which arises is that even if the subject is located at the same position, the image will not be in focus on the side of the image sensing plane.

In order to deal with this problem in which the focus position of an image sensing system is shifted owing to the spectral characteristics of a light source, the specifications of Japanese Patent Publication No. 1-45883 and Japanese Patent Application Laid-Open No. 2000-275512 disclose a camera in which the focus position is corrected in accordance with the type of light source.

The inventions described in these specifications disclose a method of discriminating the type of light source by comparing the outputs of two types of sensors having different spectral sensitivities, and correcting the focus position (i.e., the position of the focusing lens) in accordance with the type of light source discriminated, thereby correcting for a shift in focus ascribable to the spectral characteristics of the light source.

However, with the autofocusing cameras disclosed in the specifications of Japanese Patent Publication No. 1-45883 and of the Japanese Patent Application Laid-Open No. 2000-275512, the amount of correction of the focus position with respect to chromatic aberration is handled as a fixed value. If this is applied directly to an autofocusing camera of the type having interchangeable lenses, the amount of focus correction will be too much or too little in cases where chromatic aberration differs owing to a difference between one lens and another.

SUMMARY OF THE INVENTION

The present invention has been devised in view of the circumstances set forth above and its object is to realize autofocusing of excellent precision in which a shift in focus ascribable to the type of light source is suppressed, even when different lenses are used, in a TTL phase-difference detecting type autofocusing camera with interchangeable lenses.

According to the present invention, the foregoing object is attained by providing a focus-state detecting apparatus comprising:

a focus-state detection unit that detects a focus-adjusted state of a lens unit;

a chromatic aberration information acquisition unit that acquires information relating to chromatic aberration of the lens unit, the chromatic aberration corresponding to wavelength of light;

a storage unit that stores a correction value of chromatic aberration based upon color of a light source;

a correction value acquisition unit that acquires a correction value, which corresponds to the color of a light source of a subject, from the storage unit; and a correction unit that corrects information concerning the focus-adjusted state, which has been detected by the focus-state detection unit, in accordance with the information relating to chromatic aberration acquired by the chromatic aberration information acquisition unit and the correction value acquired by the correction value acquisition unit;

wherein the information relating to chromatic aberration, which conforms to the wavelength of light, of the lens unit is information that is based upon focal length of the lens unit and distance to the subject.

According to the present invention, the foregoing object is also attained by providing an image sensing apparatus on which lens units of a plurality of types are removably mounted, the apparatus having the focus-state detecting device set forth in the above.

According to the present invention, the foregoing object is also attained by providing an image sensing system comprising:

an image sensing apparatus main body having the focus-state detecting device set forth in the above; and a lens unit removably mounted on the image sensing apparatus main body.

According to the present invention, the foregoing object is also attained by providing a lens unit used upon being mounted on an image sensing apparatus main body, comprising:

a storage unit that stores information relating to chromatic aberration that conforms to wavelength of light; and a transmitting unit that transmits the information relating to chromatic aberration to the image sensing apparatus main body on which the lens unit has been mounted;

wherein the information relating to chromatic aberration, which correspond to the wavelength of light, of the lens unit is based upon focal length of the lens unit and distance to the subject.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

DETAILED DESCRIPTION OF THE PREFERRED EMBODIMENT

A preferred embodiment of the present invention will be described in detail in accordance with the accompanying drawings. However, the dimensions, shapes and relative positions of the constituent parts shown in the embodiments should be changed as convenient depending on various conditions and on the structure of the apparatus adapted to the invention, and the invention is not limited to the embodiments described herein.

Figure 1:
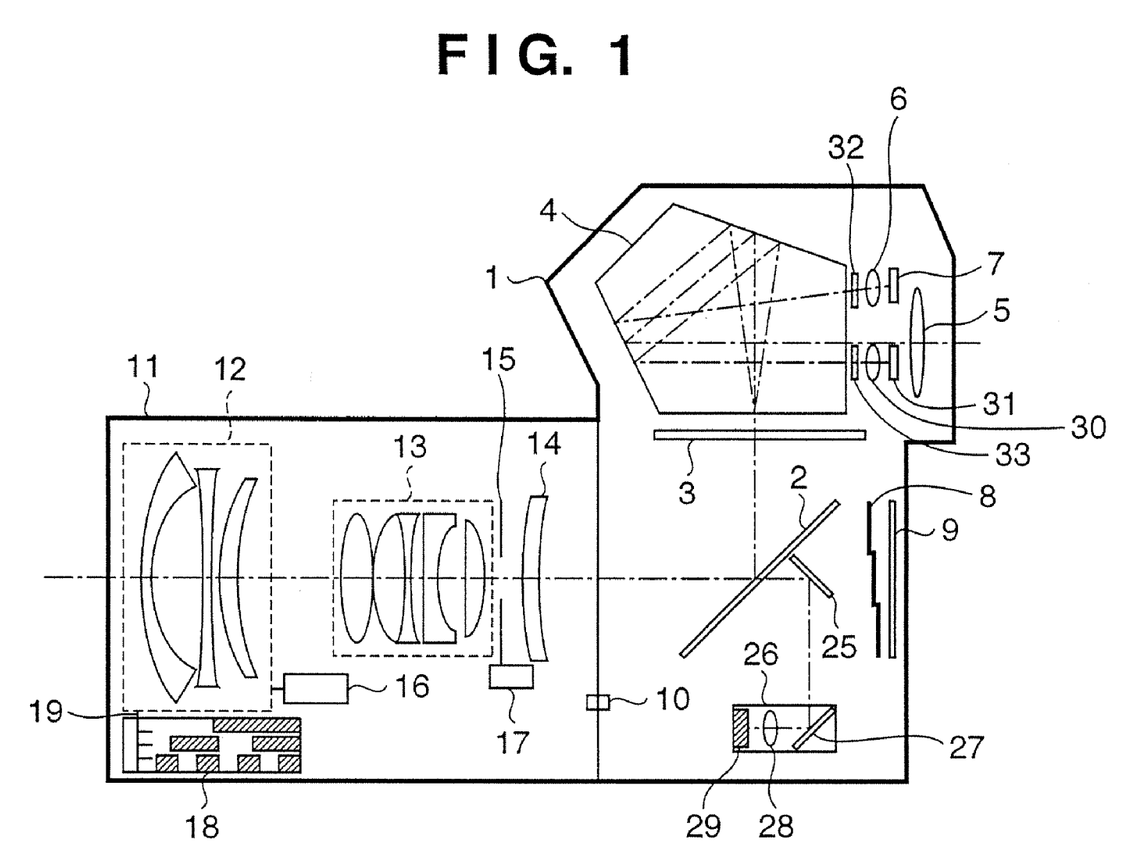
FIG. 1 is a diagram schematically illustrating the structure of a camera system comprising a single-lens reflex camera and an interchangeable lens mounted in the camera in a preferred embodiment of the present invention.

FIG. 1 is a diagram schematically illustrating the structure of an autofocusing camera system comprising a single-lens reflex camera and an interchangeable lens mounted on the camera in a preferred embodiment of the present invention. FIG. 1 primarily illustrates the optical arrangement of the components.

The camera has a camera body 1 in the front end of which a lens unit 11 is mounted. The camera body 1 houses optical components, mechanical components, electrical circuitry and an image sensing device such as film or a CCD, and the camera is capable of taking a picture using film or capturing an image by a photoelectric converter. A main mirror 2 is placed at an incline in the optical path of photography when the photographer observes the subject through a finder, and is withdrawn from this optical path when a photo is taken. The main mirror 2 is a half-mirror. When the main mirror 2 is placed at an incline in the optical path of photography, approximately half the light from the subject to an focus-state detection unit 26 (described later) is transmitted through the mirror 2.

A focusing screen 3 is placed in a planned image forming place of lenses 12 to 14, described later, and a pentagonal prism 4 is provided for changing the optical path of the finder. An eyepiece 5 provides a window through which the photographer observes the focusing screen 3, thereby allowing the photographer to check the picture to be taken. A first image forming lens 6 and a first photometer 7 are for measuring the luminance of the subject in the observing screen of the finder. Reference numerals 30 and 31 similarly denote a second image forming lens and a second photometer, respectively. An optical filter 32 cuts wavelength on the long wavelength side, and an optical filter 33 cuts wavelength on the side of visible light. The first photometer 7 and the second photometer 31 internally possess a well-known logarithmic compression circuit and the outputs of these sensors are signals that have been logarithmically compressed.

Reference numeral 8 denotes a focal-plane shutter, an reference numeral 9 denotes a photosensitive member that employs a silver-halide emulsion film or an image sensing device such as a CCD or CMOS sensor. A sub-mirror 25 is placed at an incline in the optical path of photography together with the main mirror 2 when the photographer observes the subject through the finder, and is withdrawn from this optical path when a photo is taken. The sub-mirror 25 bends downward the light beam that has passed through the inclined main mirror 2 and guides the light beam toward the focus-state detection unit 26.

The focus-state detection unit 26 comprises a secondary image forming mirror 27, a secondary image forming lens 28, a focus-state detecting line sensor 29 and a focus-state detection circuit, etc. The secondary image forming mirror 27 and secondary image forming lens 28 construct a focus-state detecting optical system and form a secondary image forming plane of the lens unit 11 on the a focus-state detecting line sensor 29. The a focus-state detection unit 26 detects the state of focus adjustment of the lens unit 11 by the so-called phase-difference detection method and sends the result of detection to an autofocus adjustment device that controls the focus adjusting mechanism of the lens unit 11.

A mount contact group 10 serves as a communication interface between the camera body 1 and the lens unit 11.

A first lens group 12 (referred to as a "focusing lens" below) is moved back and forth along the optic axis to adjust the focus position of the image-sensing screen, and a second lens group 13 is moved back and forth along the optic axis to change the focal length of the lens unit 11 and scale the image-sensing screen. A third lens group 14 is fixed. Reference numerals 15 and 16 denote an iris diaphragm and a driving motor, respectively. The driving motor 16 is a focus driving motor for moving the focusing lens 12 back and forth along the optic axis when the autofocusing operation is performed. An aperture driving motor 17 changes the aperture diameter of the iris diaphragm 15. Owing to the sliding of a brush 19 attached to the first lens group 12, a distance encoder 18 reads the position of the focusing lens 12 and generates a signal that corresponds to the distance to the subject. More specifically, the distance encoder 18, brush 19 and a lens microprocessor 112 (described later) construct subject-distance detecting means for reading the position of the focusing lens 12 after focus has been adjusted and outputting a signal (subject-distance information) in which this position has been converted to subject distance prevailing at this time.

The circuitry of this camera system will now be described with reference to FIG. 2. Components identical with those in FIG. 1 are designated by like reference characters.

The circuitry in the camera body 1 will be described first.

Connected to a camera microprocessor 100 are a focus-state detecting circuit 105, the first photometer 7, the second photometer 31, a shutter control circuit 107, a motor control circuit 108 and a liquid crystal display circuit 111. The camera microprocessor 100 sends signals to the lens microprocessor 112, which is disposed inside the lens unit 11, via the mount contacts 10.

The focus-state detecting circuit 105 performs charge-accumulation and readout control of the focus-state detecting line sensor 29 in accordance with a signal from the camera microprocessor 100 and outputs pixel information to the camera microprocessor 100. The latter subjects this information to an analog-to-digital conversion, detects the state of focus adjustment by the phase-difference detection method and exchanges signals with the lens microprocessor 112 to thereby control the focusing of the lens unit 11.

In accordance with a signal from the camera microprocessor 100, the shutter control circuit 107 controls the excitation of a front-curtain driving magnet MG-1 and of a rear-curtain driving magnet MG-2 that construct the focal-plane shutter 8, thereby driving the front and rear curtains of the shutter to perform an exposure operation. The motor control circuit 108 controls a motor M in accordance with a signal from the camera microprocessor 100, thereby moving the main mirror 2 and sub-mirror 25 up and down and performing shutter charge, etc.

A switch SW1 is a switch that is turned ON by a first stroke (half-depression) of a release button (not shown) to start image-sensing preparations such as photometry and autofocusing. A switch SW2 is a switch that is turned on by a second stroke (full-depression) of the release button to drive the shutter, i.e., to start the exposure operation. Switch-status signals from the switches SW1 and SW2 and from switches such as an ISO sensitivity setting switch, aperture setting switch and shutter-speed-setting switch are read by the camera microprocessor 100.

The liquid crystal display circuit 111 controls an indicator 24 within the finder and an external display unit 42 in accordance with signals from the camera microprocessor 100.

The electrical circuitry within the lens unit 11 will be described next.

As mentioned above, the camera body 1 and lens unit 11 are electrically interconnected via the lens-mount contacts 10. The lens-mount contacts 10 include a contact L0, which is a power-supply contact of the focus driving motor 16 and aperture driving motor 17 within the lens unit 11; a power-supply contact L1 for the lens microprocessor 112; a clock contact L2 for communicating serial data; a contact L3 for transmitting data from the camera body 1 to the lens unit 11; a contact L4 for transmitting data from the lens unit 11 to the camera body 1; a contact L5 for grounding the motors with respect to the motor power supply; and a contact L6 for grounding with respect to the power supply for the lens microprocessor 112.

The lens microprocessor 112 is connected to the camera microprocessor 100 via the lens-mount contacts 10, operates the focus driving motor 16 for driving the focusing lens 12 and the aperture driving motor 17 for driving the iris diaphragm 15 in accordance with signals from the camera microprocessor 100, and controls focusing and aperture of the lens unit 11. Numerals 50 and 51 denote a light detector and pulse plate, respectively. The lens microprocessor 112 counts the number of pulses produced by the light detector 50 and pulse plate 51 to thereby obtain information concerning the position of the focusing lens 12 at the time of focal adjustment (focusing). As a result, the lens unit 11 can be focused.

The distance encoder 18 reads the position information of the focusing lens 12 and inputs this position information to the lens microprocessor 112, which proceeds to convert this information to subject-distance information and transmit the distance information to the camera microprocessor 100.

The spectral characteristics of the first and second photometers 7 and 31 will now be described with reference to FIG. 3.

Figure 3:
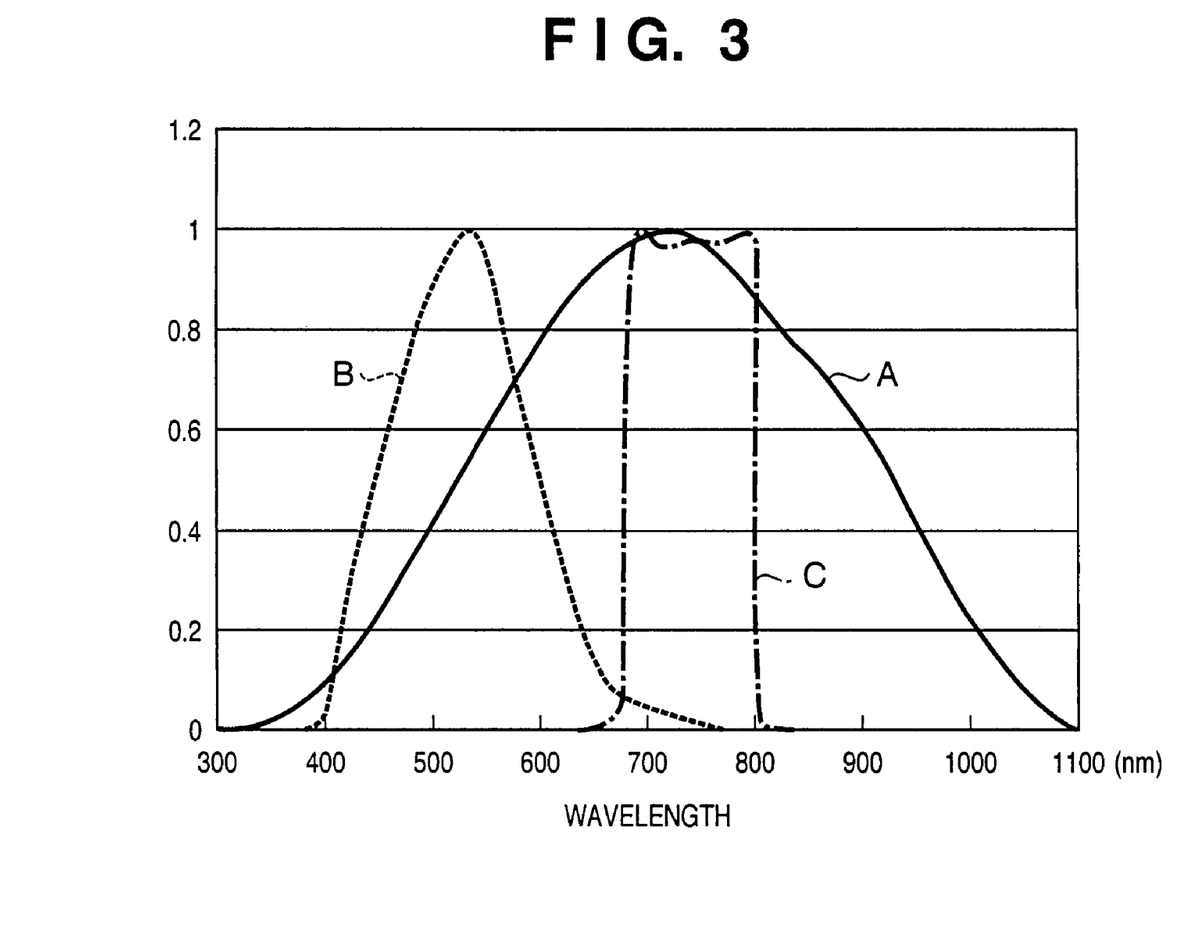
FIG. 3 is a graph useful in describing the spectral sensitivity characteristics of a photometer with which the camera system of the embodiment of the present invention is equipped.

The abscissa in FIG. 3 is a plot of the wavelength of light, and the ordinate is a plot of spectral sensitivity in which the highest spectral sensitivity has been normalized as one. Further, A represents the spectral sensitivity characteristic of the first and second photometers 7, 31, respectively, B the spectral sensitivity characteristic of the optical filter 32 placed in front of the first photometer 7, and C the spectral sensitivity characteristic of the optical filter 33 placed in front of the second photometer 31. Accordingly, the first photometer 7 mainly senses light in the visible region, and the second photometer 31 mainly senses light in the long-wavelength region outside of the visible region.

Figure 4:
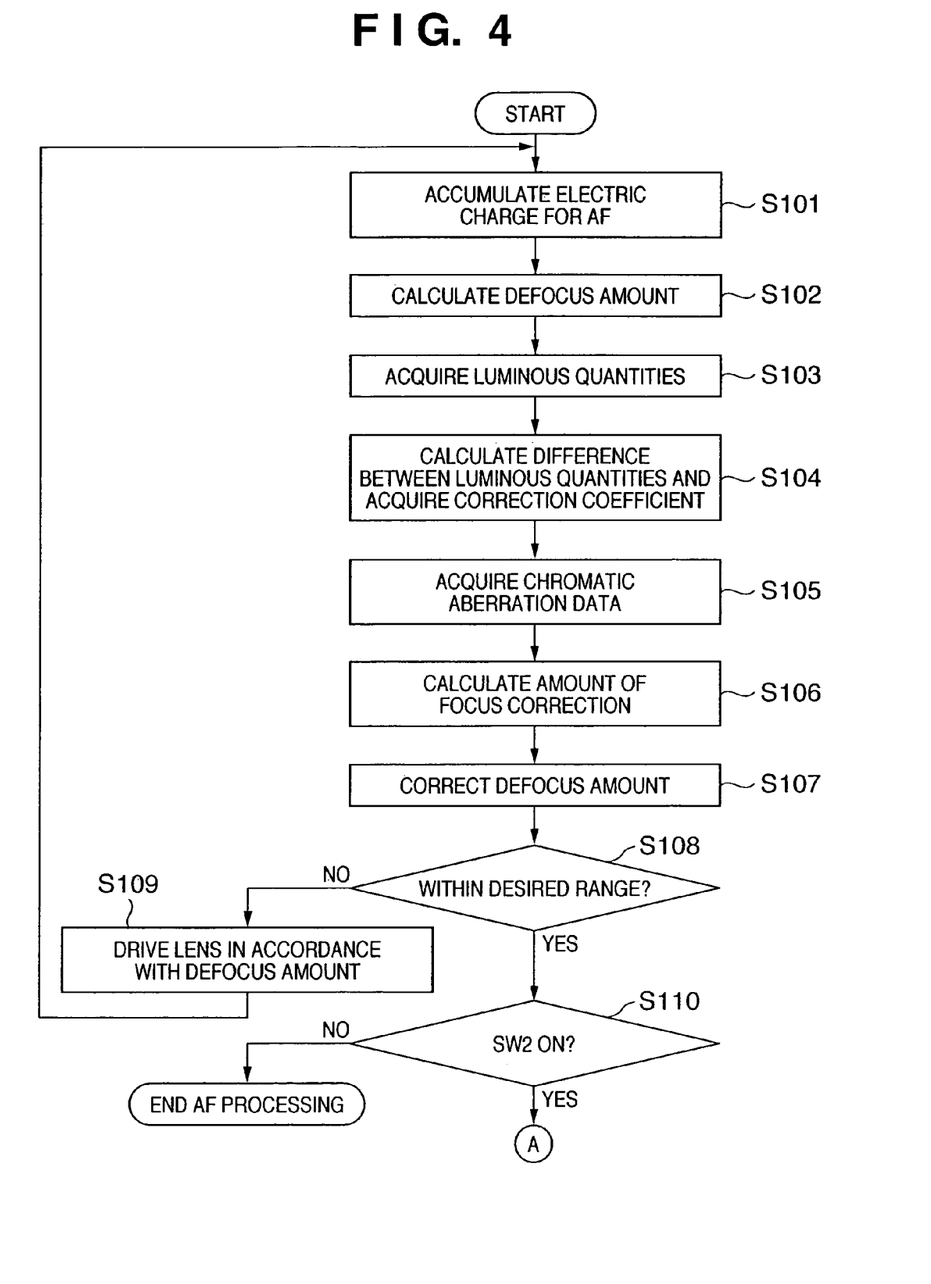
FIGS. 4 and 5 are flowcharts illustrating an operation of the camera system according to the embodiment of the present invention.

The autofocusing operation of the camera system having the configuration set forth above will now be described using the flowchart of FIG. 4.

Figure 2:
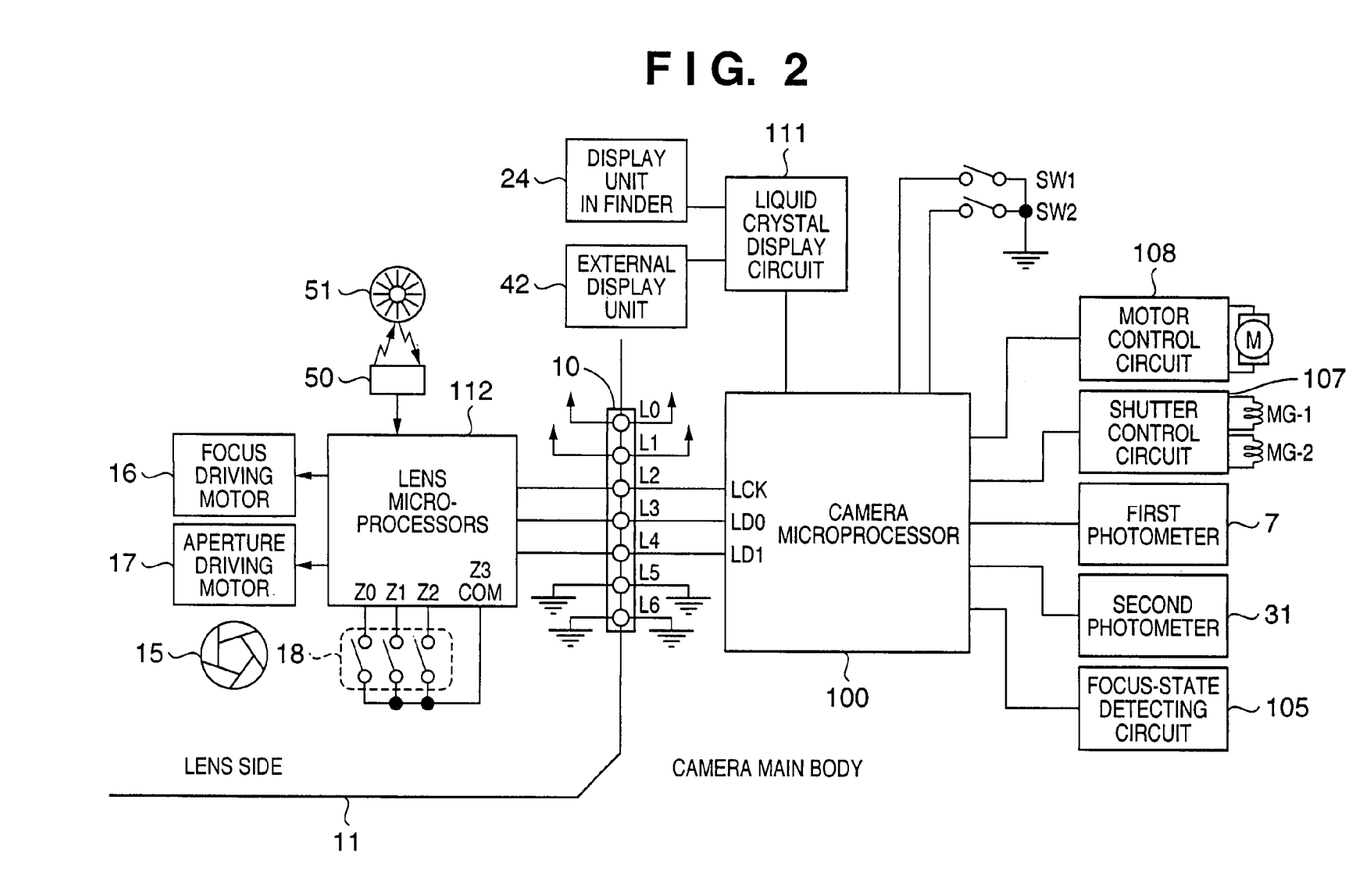
FIG. 2 is a block diagram illustrating the circuitry of the camera system according to the embodiment of the present invention.

When the switch SW1 on the camera body 1 shown in FIG. 2 is pressed, operation is started at step S101. Here the camera microprocessor 100 performs the accumulation of electric charge of the focus-state detecting line sensor 29 within the focus-state detection unit 26 that includes the focus-state detecting circuit 105, and reads the image of the subject that has been formed.

Next, at step S102, the camera microprocessor 100 calculates an amount of defocus from the offset between the two acquired images using the well-known phase-difference focus detection method. Here the camera microprocessor 100 multiplies the offset (number of bits) between the two images on the focus-state detecting line sensor 29 by optical coefficients such as the sensor pitch (mm) and base-line length of the autofocusing system, thereby obtaining the defocus amount (mm) on the image-sensing image plane.

Figure 6:
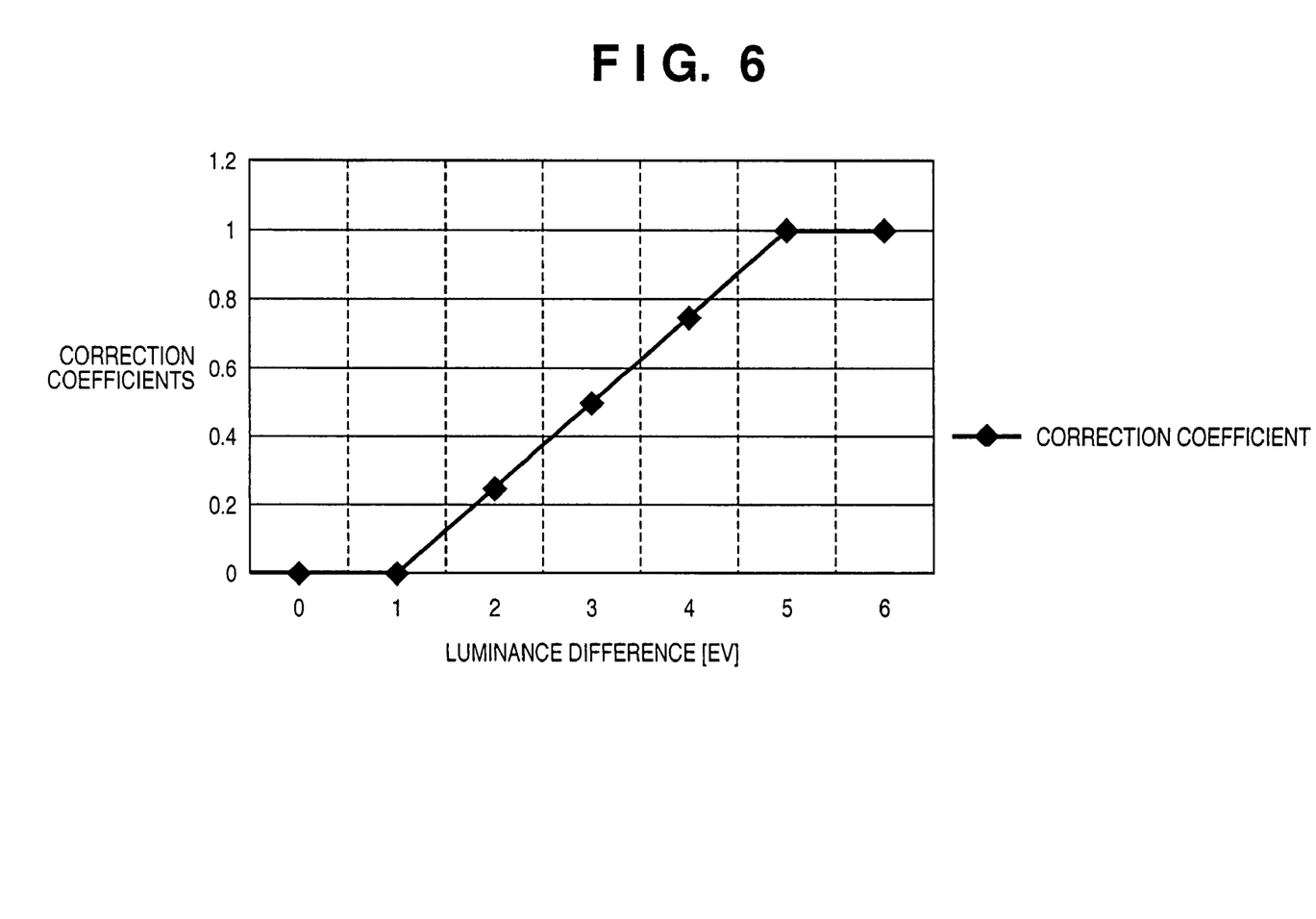
FIG. 6 is a table illustrating an example of correction coefficients according to the embodiment of the present invention.

Next, at step S103, the camera microprocessor 100 reads out luminous quantities from the first photometer 7 and second photometer 31 and, at step S104, calculates the difference between the luminous quantities by subtracting the luminous quantity of the first photometer 7 from the luminous quantity of the second photometer 31 and reads out a correction coefficient from the table of FIG. 6 in accordance with the difference obtained.

The data illustrated in FIG. 6 has been stored in a ROM (not shown) of the camera microprocessor 100. The abscissa in FIG. 6 corresponds to the difference between the luminous quantities of the first and second first photometers 7, 31, and the ordinate indicates correction coefficients conforming to the luminance differences between the two sensors. In the example shown in FIG. 6, if the luminance difference between the first photometer 7 and the second photometer 31 is 3 steps, then the correction coefficient is 0.5, by way of example. Thus, the smaller the output of the second photometer 31 that mainly detects light in the region of long wavelengths, the more the light source includes light in the region of short wavelengths and, hence, the larger the correction coefficient.

Next, at step S105, the camera microprocessor 100 instructs the lens microprocessor 112 to transmit the amount of chromatic aberration via the serial communication lines LCK, LDO), LDI. Upon receiving this communication, the lens microprocessor 112 analyzes the content of the communication. If the communication is such that the command is one inquiring about the amount of chromatic aberration, then chromatic aberration data conforming to the present focal length and focus position is read out of the ROM (not shown) in the lens microprocessor 112 and sends the data back to the camera microprocessor 100 via the serial communication lines LCK, LDO, LDI.

Figure 7:
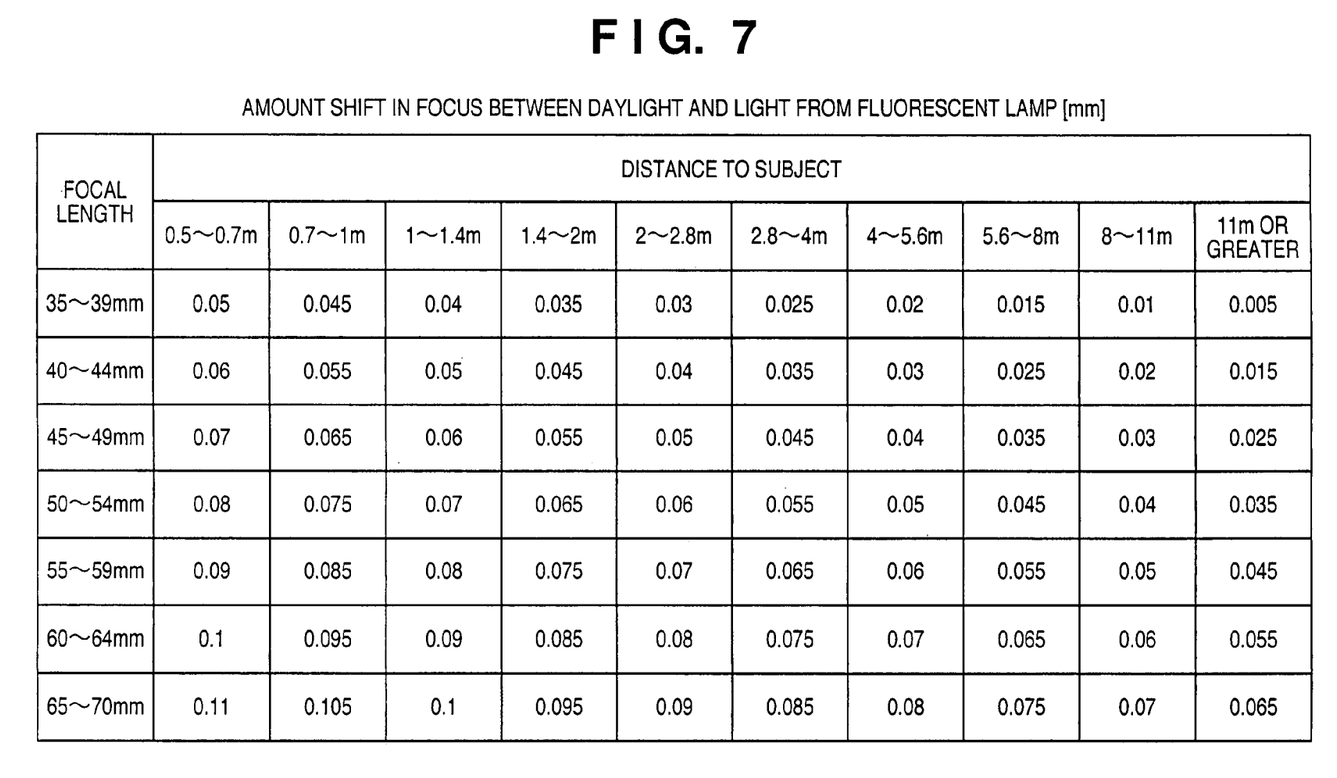
FIG. 7 is a diagram illustrating an example of a chromatic aberration characteristic of a lens unit according to the embodiment of the present invention.

FIG. 7 is a diagram illustrating an example of chromatic aberration data that has been stored in the table of the ROM in a case where a 35 to 70 mm zoom lens has been mounted on the camera 1 as the lens unit 11. This data indicate amount of shift in focus (which matches the amount of chromatic aberration ascribable to a disparity in center-of-gravity wavelength), with respect to an AF position in daylight, under a fluorescent lamp serving as a typical light source that illuminates the subject with light in the short-wavelength region. This indicates the amounts of shift in focus at subject distances at each focal length of the lens. The amount of shift is read from the table out of the ROM using the focal length and subject distance (the position of the focusing lens 12 read by the encoder 18) as an address. Each interchangeable lens unit has its own chromatic aberration data of the kind shown in FIG. 7. Since these are basically values decided by optical design, they need only be stored permanently in the ROM. However, it is also permissible to measure the amount of shift in focus at the time of manufacture taking into account manufacturing error and store the values in writable storage means such as an EEPROM or flash ROM.

Further, the amount of displacement of focus may be approximated by a polynomial in which focal length and subject position are adopted as parameters, and the coefficients of the polynomial may be similarly stored in a ROM, EEPROM or flash ROM. When data representing the amount of shift in focus is used, this may be found by calculation based upon the focal length and the distance to the subject.

Next, at step S106, the camera microprocessor 100 multiplies the chromatic aberration data of the lens, which was acquired at step S105, by the correction coefficient found at step S104, thereby calculating the amount of focus correction. Then, at step S107, the camera microprocessor 100 adds the amount of focus correction to the defocus amount found at step S102, thereby calculating the final defocus amount. That is, if we let def, c and k represent the defocus amount, amount of chromatic aberration and focus correction coefficient, respectively, then the final defocus amount can be obtained by the following equation:

$$\text{final defocus amount} = k \times c + def$$

Next, at step S108, it is judged that the in-focus state has been attained if this amount of defocus falls within a desired range, e.g., $(\frac{1}{4})F\delta$ (where F represents the f-stop number of the lens and $\delta$ is 20 um, which is a constant, meaning that the desired range is 10 um with an open iris of an F2.0 lens), and autofocusing is terminated. If the amount of autofocus is greater than $(\frac{1}{4})F\delta$, then this amount of defocus is transmitted to the lens microprocessor 112 via the serial communication lines LCK, LDO, LDI at step S109 to command that the lens be driven. Upon receiving the command, the lens microprocessor 112 decides the driving direction of the focus driving motor 16 and drives the focus driving motor 16 in accordance with the amount of defocus instructed. Control then returns to step S101 and the above-described operation is repeated until the in-focus state is attained.

If it is judged at step S108 that the in-focus state has been attained, then control proceeds to step S110, where the status of the release-start switch SW2 is discriminated. If the switch SW2 is ON, control proceeds to step S201 in FIG. 5, where the camera microprocessor 100 performs an image-sensing operation. If the switch SW2 is OFF, then the camera microprocessor 100 terminates AF processing.

Figure 5:
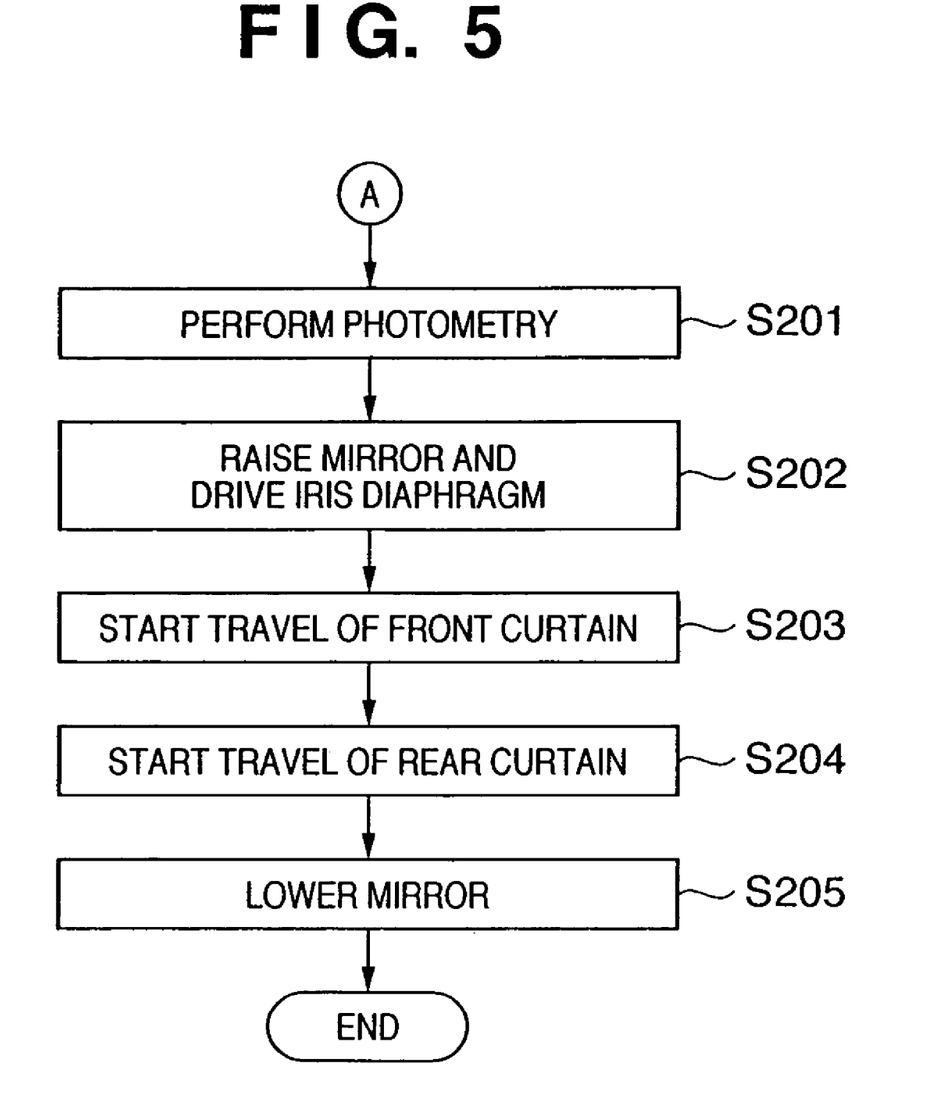

Next, the operation for taking an image will be described with reference to FIG. 5.

If the autofocusing operation ends and the release-start switch SW2 is in the ON state, then the camera microprocessor 100 obtains subject luminance BV from the luminous quantity of first photometer 7, which meters light of a wavelength on the visible side, adds the luminance BV to the set ISO sensitivity SV to obtain an exposure value EV, and calculates f-stop number AV and shutter speed TV by a well-known method. It should be noted that the photometry operation may just as well be performed before the decision of step S110 in FIG. 4.

Next, at step S202, the camera microprocessor 100 causes the main mirror 2 to pop up and withdraw from the image-sensing optical path and, at the same time, instructs the lens microprocessor 112 to narrow down the f-stop number to the f-stop number AV that was decided at step S201. The lens microprocessor 112 receives this command and adjusts the iris diaphragm 15. When the main mirror 2 is thenceforth made to totally withdraw from the image-taking optical path, the camera microprocessor 100 passes a current into the front-curtain driving magnet MG-1 to start the operation that releases the focal-plane shutter 8 at step S203.

When the prescribed shutter release time elapses, control proceeds to step S204, where the camera microprocessor 100 passes a current into the rear-curtain driving magnet MG-2 to thereby close the rear curtain of the focal-plane shutter 8 and terminate exposure. The camera microprocessor 100 causes the main mirror 2 to drop at step S205, thereby terminating image sensing.

Thus, in accordance with this embodiment as described above, if a lens unit is capable of being interchangeably mounted on a camera body, chromatic aberration data specific to this lens unit is acquired from the lens unit, an amount of correction that conforms to the color of the light source is acquired and an amount of defocus is corrected based upon acquired chromatic aberration data specific to the lens unit and the amount of correction. As a result, even when a different lens unit is mounted, it is possible to perform a correction of the defocus amount suited to the mounted lens unit.

The foregoing embodiment has been described with regard to a case where a lens unit possesses chromatic aberration data that is unique to the lens unit. However, in cases where the types of lens units that can be mounted on a camera body are limited, the chromatic aberration data may be held by the camera body for every type of lens unit, and the type of lens unit and position of the focusing lens may be acquired from the lens unit mounted so that the corresponding chromatic aberration data may be read out.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-285164 filed on Sep. 29, 2004, which is hereby incorporated herein by reference.

What is claimed is:

1. A focus-state detecting device to which a removable lens unit is mounted, comprising:

a focus-state detection unit that detects a focus-adjusted state of a currently mounted removable lens unit;

a first acquisition unit that acquires information on chromatic aberration of the currently mounted removable lens unit corresponding to a lens position of the currently mounted removable lens unit;

a second acquisition unit that acquires information on spectral characteristics of a subject;

a correction unit that corrects information on the focus-adjusted state, which has been detected by said focus-state detection unit, in accordance with the information acquired by said first and second acquisition units; and a control unit that repeats, upon detection by said focus-state detection unit of the focus-adjusted state of the currently mounted removable lens unit, the operations of:

acquiring information on spectral characteristics of a subject by said second acquisition unit, acquiring, by said first acquisition unit, information on chromatic aberration of the currently mounted removable lens unit corresponding to a lens position of the currently mounted removable lens unit at a time of detecting the focus-adjusted state, and correcting the detected information of the focus-adjusted state detected by said focus-state detection unit based on the information acquired by said first and second acquisition units and driving the currently mounted removable lens unit in accordance with the corrected information.

2. The device according to claim 1, wherein said focus-state detection unit splits a light beam, which has passed through the currently mounted removable lens unit, into two light beams and detects the focus-adjusted state based upon a phase difference between two images formed by respective ones of the two light beams.

3. The device according to claim 1, wherein the information that corresponds to the lens position of the currently mounted removable lens unit is information corresponding to the focal length and distance to the subject.

4. The device according to claim 1, further comprising:

a first photometer that mainly meters a visible-light region in a light beam that has passed through the currently mounted removable lens unit; and a second photometer that mainly meters a wavelength region longer than visible light in a light beam that has passed through the currently mounted removable lens unit;

wherein said second acquisition unit acquires the information on the spectral characteristics of the subject in accordance with outputs from said first and second photometers.

5. An image sensing apparatus on which lens units of a plurality of types are removably mounted, said apparatus having the focus-state detecting device set forth in claim 1.

6. The apparatus according to claim 5, wherein said first acquisition unit acquires information on chromatic aberration from the currently mounted removable lens unit.

7. The apparatus according to claim 5, further comprising:

a lens-status acquisition unit that acquires the type of currently mounted removable lens unit and position of a focus lens; and a storage unit that stores information, which relates to chromatic aberration corresponding to the wavelength of light, for different types of currently mounted removable lens units;

wherein said first acquisition unit acquires information on chromatic aberration from said storage unit based upon the type of currently mounted removable lens unit acquired by said lens-status acquisition unit and position of the focus lens.

8. An image sensing system comprising:

an image sensing apparatus main body having the focus-state detecting device set forth in claim 1; and a lens unit removably mounted on said image sensing apparatus main body.

9. The system according to claim 8, wherein said removable lens unit has a storage unit that stores information on chromatic aberration conforming to wavelength of light; and said first acquisition unit acquires information on chromatic aberration from the currently mounted removable lens unit.

10. The system according to claim 8, further comprising:

a lens-status acquisition unit that acquires the type of currently mounted removable lens unit and position of a focus lens; and a storage unit that stores information, which relates to chromatic aberration conforming to the wavelength of light, for different types of currently mounted removable lens units;

wherein said first acquisition unit acquires information on chromatic aberration from said storage unit based upon the type of currently mounted removable lens unit acquired by said lens-status acquisition unit and position of the focus lens.

* * * * *